(12) United States Patent
Arinaga et al.

(10) Patent No.: US 8,364,323 B2
(45) Date of Patent: Jan. 29, 2013

(54) WIND POWER GENERATION SYSTEM AND OPERATION CONTROL METHOD THEREOF

(75) Inventors: Shinji Arinaga, Nagasaki (JP); Takatoshi Matsushita, Nagasaki (JP); Tsuyoshi Wakasa, Nagasaki (JP); Masaaki Shibata, Nagasaki (JP); Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 214 days.

(21) Appl. No.: 12/674,873

(22) PCT Filed: Dec. 14, 2007

(86) PCT No.: PCT/JP2007/074110
§ 371 (c)(1),
(2), (4) Date: Mar. 23, 2010

(87) PCT Pub. No.: WO2009/078072
PCT Pub. Date: Jun. 25, 2009

(65) Prior Publication Data
US 2011/0204630 A1   Aug. 25, 2011

(51) Int. Cl.
*G06F 19/00*   (2011.01)
(52) U.S. Cl. ........... 700/287; 700/286; 700/291; 290/44
(58) Field of Classification Search .................. 700/287, 700/286, 291; 290/44
See application file for complete search history.

(56) References Cited

U.S. PATENT DOCUMENTS

| | | | | |
|---|---|---|---|---|
| 6,512,966 B2* | 1/2003 | Lof et al. | ...................... | 700/291 |
| 6,724,097 B1 | 4/2004 | Wobben | | |
| 6,946,751 B2 | 9/2005 | Yoshida et al. | | |
| 7,437,216 B2* | 10/2008 | Riesberg et al. | ............... | 700/286 |
| 7,447,613 B2* | 11/2008 | Mertins et al. | .................... | 703/1 |
| 7,756,609 B2* | 7/2010 | Jurkat et al. | .................... | 700/286 |
| 7,804,183 B2* | 9/2010 | Arinaga | ........................... | 290/44 |
| 7,822,582 B2* | 10/2010 | Mertins et al. | .................... | 703/1 |
| 7,875,991 B2* | 1/2011 | Wobben | .......................... | 290/44 |

(Continued)

FOREIGN PATENT DOCUMENTS

| EP | 1 571 746 A1 | 9/2005 |
|---|---|---|
| EP | 1 672 778 A2 | 6/2006 |

(Continued)

OTHER PUBLICATIONS

Bechrakis, D.A.; Sparis, P.D.; , "Correlation of wind speed between neighboring measuring stations," Energy Conversion, IEEE Transactions on , vol. 19, No. 2, pp. 400-406, Jun. 2004.*

(Continued)

*Primary Examiner* — Dave Robertson
(74) *Attorney, Agent, or Firm* — Manabu Kanesaka; Kenneth M. Berner; Benjamin J. Hauptman

(57) ABSTRACT

A method of controlling an operation of a wind power generation system provided with a plurality of wind turbines, in which output power of each wind turbine is supplied to an electric power system through a common interconnection node where output data of each wind turbine is obtained, where a periodic correlation between output fluctuations of adjacent wind turbines is determined by using the output data, the correlation is determined as a strong correlation when the correlation is more than two times greater than an average level of the correlation, and a phase of the output of either one of the adjacent wind turbines is shifted by a period of the strong correlation.

8 Claims, 5 Drawing Sheets

U.S. PATENT DOCUMENTS

| | | | |
|---|---|---|---|
| 7,999,406 B2 * | 8/2011 | Cardinal et al. | 290/44 |
| 2004/0183307 A1 | 9/2004 | Yoshida et al. | |
| 2006/0142899 A1 | 6/2006 | Wobben | |

FOREIGN PATENT DOCUMENTS

| | | |
|---|---|---|
| JP | 2000-087841 | 3/2000 |
| WO | WO 01/73518 A1 | 10/2001 |

OTHER PUBLICATIONS

Sorensen, P.; Cutululis, N. A.; Vigueras-Rodriguez, A.; Jensen, L.E.; Hjerrild, J.; Donovan, M.H.; Madsen, H.;, "Power Fluctuations From Large Wind Farms," Power Systems, IEEE Transactions on , vol. 22, No. 3, pp. 958-965, Aug. 2007.*

Yih-huei Wan, Michael Milligan, and Brian Parsons. Output Power Correlation Between Adjacent Wind Power Plants in J. Sol. Energy Eng. 125, 551 (2003).*

Wei Qiao; Harley, R.G.; Venayagamoorthy, G.K.;, "Dynamic Modeling of Wind Farms with Fixed-Speed Wind Turbine Generators," Power Engineering Society General Meeting, 2007. IEEE , vol., no., pp. 1-8, Jun. 24-28, 2007.*

Sakamoto, R.; Senjyu, T.; Urasaki, N.; Funabashi, T.; Fujita, H.; Sekine, H.;, "Output power leveling of wind turbine generators using pitch angle control for all operating regions in wind farm," Intelligent Systems Application to Power Systems, 2005. Proceedings of the 13th International Conference on , vol., no., pp. 6 pp., Nov. 6-10, 2005.*

Teruhisa Kumano, "A Study on Power Fluctuation Smoothing Control for Wind Farm Considering Spatial Distribution of Wind Speed", Heisei 18 nen Proceedings of the Annual conference of Power & Energy Society IEEJ, Conference of Power & Energy Society IEEJ, Sep. 13, 2006, (37-9) to (37-10).

* cited by examiner

WIND POWER GENERATION SYSTEM AND OPERATION CONTROL METHOD THEREOF

RELATED APPLICATIONS

The present application is National Phase of International Application No. PCT/JP2007/074110 filed Dec. 14, 2007, the disclosure of which is hereby incorporated by reference herein in its entirety.

TECHNICAL FIELD

The present invention relates to a wind power generation system and an operation control method thereof.

BACKGROUND ART

Smoothing output fluctuations of a wind farm is known. If the standard deviation of the output fluctuation of one wind turbine is defined as σ, then the standard deviation $\sigma_{total}$ of the output fluctuation of a wind farm with M wind turbines is represented by the following equation (1) provided that the output fluctuations of each wind turbine are not correlated (random).

[Equation 1]

$$\sigma_{total} = \sigma\sqrt{M} \qquad (1)$$

Patent Citation 1: U.S. Pat. No. 6,724,097, specification
Patent Citation 2: U.S. Pat. No. 6,946,751, specification

DISCLOSURE OF INVENTION

However, if the correlation of the output fluctuations of each wind turbine in the wind farm is high, there is a risk that the output fluctuation of the wind farm will not be smoothed, but will be observed as a large output fluctuation.

The present invention has been conceived to solve the above-mentioned problems, and an object thereof is to provide a wind power generation system that can lower the output fluctuation at an interconnection node and an operation control method thereof.

In order to solve the above-mentioned problem, the present invention employs the following solutions.

The first aspect of the present invention is an operation control method of a wind power generation system provided with a plurality of wind turbines, in which output power of each wind turbine is supplied to an electric power system through a common interconnection node, the operation control method of the wind power generation system comprising: a step of obtaining the output data of each wind turbine; a step of determining a correlation between output fluctuations of adjacent wind turbines by using the output data; and a step of shifting, if a strong correlation is exhibited, a phase of the output fluctuation of either one of the adjacent wind turbines by a period at which the strong correlation is exhibited.

According to such an operation control method, the correlation of the output fluctuations of the wind turbines positioned adjacently is obtained and, if that correlation is strong, the phase of the output fluctuation of either one of the adjacent wind turbines is shifted by the period at which that strong correlation is exhibited, therefore, it is possible to weaken the correlation of the output fluctuations between the adjacent wind turbines.

As a result, it is possible to relax the output fluctuation in the interconnection node to which the output power of each wind turbine is supplied, and to supply more stable electric power to the electric power system.

The expression "if a strong correlation is exhibited" means, for example, a situation where a correlation value more than 2 times greater than the average level of the correlation is exhibited. For example, in the graph shown in FIG. 5, a peak exhibiting a correlation value more than 2 times greater than the average level of the correlation is shown. A situation like this will be judged as a strong correlation.

In the operation control method of the above-mentioned wind power generation system, the phase of the output fluctuation may be shifted by changing a blade pitch angle of either one of the adjacent wind turbines.

By changing either one of the blade pitch angles in this way, the rotational speed of the generator is changed; as a result, it is possible to shift the phase of the output fluctuation. Thus, it is possible to weaken the correlation of the output fluctuations between the adjacent wind turbines.

In addition, in the operation control method of the above-mentioned wind power generation system, the phase of the output fluctuation may by shifted by changing a rotational speed of a generator of either one of the adjacent wind turbines.

By changing the rotational speed of either one of the generators in this way, it is possible to shift the phase of the output fluctuation. Thus, it is possible to weaken the correlation of the output fluctuations between the adjacent wind turbines.

The second aspect of the present invention is a wind power generation system provided with a plurality of wind turbines, in which output power of each wind turbine is supplied to an electric power system through a common interconnection node, wherein output data of each wind turbine is obtained; a correlation between output fluctuations of adjacent wind turbines is determined by using the output data; and if a strong correlation is exhibited, a phase of the output of either one of the adjacent wind turbines is shifted by a period at which the strong correlation is exhibited.

According to the present invention, an advantage is afforded in that it is possible to lower the output fluctuation in the interconnection node.

EXPLANATION OF REFERENCE 1 wind power generation system
100 central control device
30 electric power line
A interconnection node
WTG1, WTG2, WTGn wind turbine

BEST MODE FOR CARRYING OUT THE INVENTION

In the following, one embodiment of a wind power generation system and an operation control method thereof according to the present invention will be described with reference to the drawings.

Figure 1:
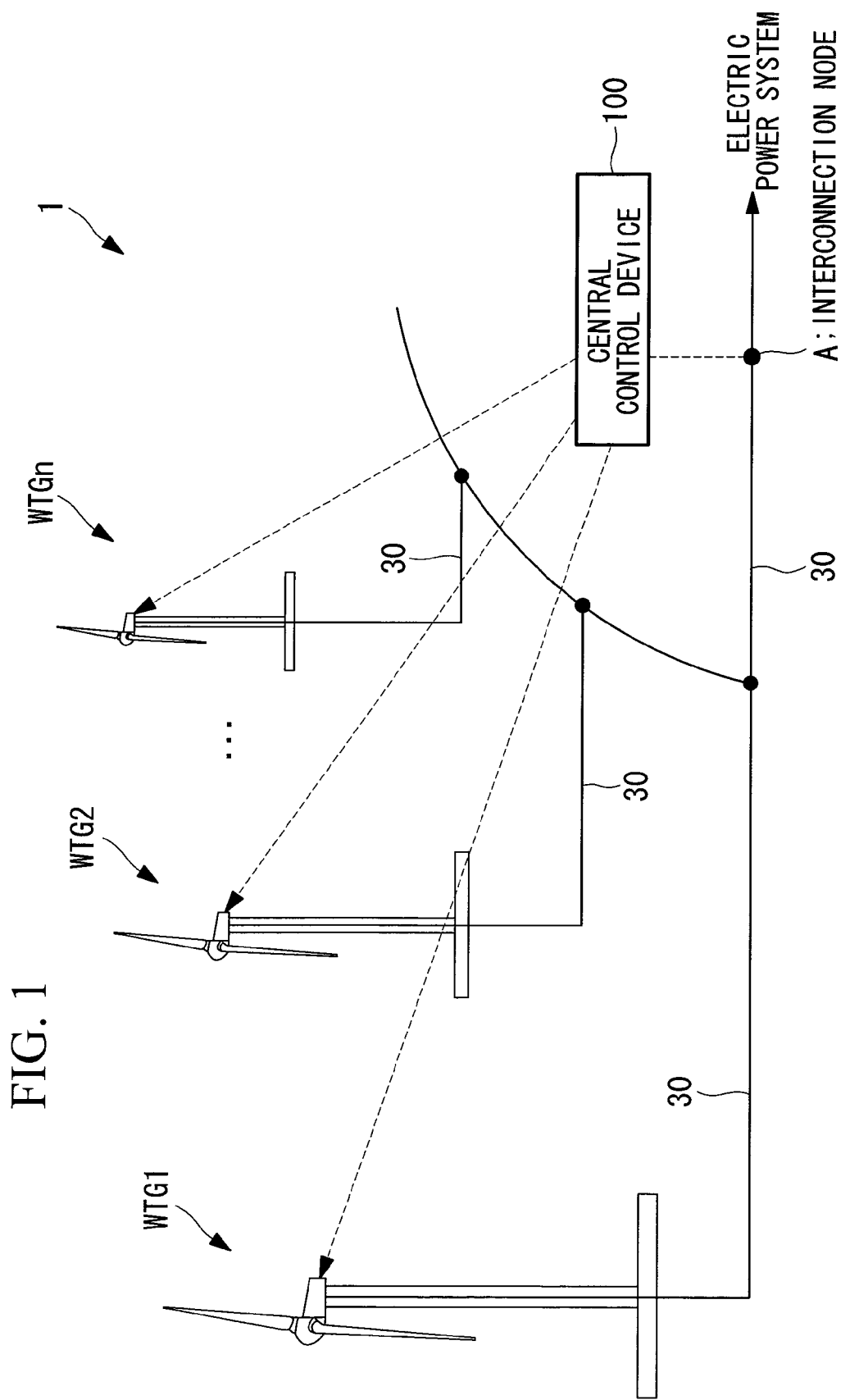
FIG. 1 is a diagram showing the overall configuration of a wind power generation system according to an embodiment of the present invention.

FIG. 1 is a block diagram showing the overall configuration of a wind power generation system according to this embodiment. As shown in FIG. 1, a wind power generation system 1 is provided with a plurality of wind turbines WTG1, WTG2, ..., WTGn (hereinafter, when referring to all wind turbines, they will be simply assigned the reference sign "WTG", and when referring to each wind turbine individually, they will be assigned reference signs "WTG1", "WTG2", and so forth) and a central control device 100 that gives a control command to the each wind turbine WTG. In this embodiment, each wind turbine WTG may be either a variable-speed wind turbine or a constant-speed wind turbine.

The output power of the each wind turbine WTG1, WTG2, ..., WTGn is supplied to an electric power system through the common interconnection node A via an electric power line 30.

Figure 2:
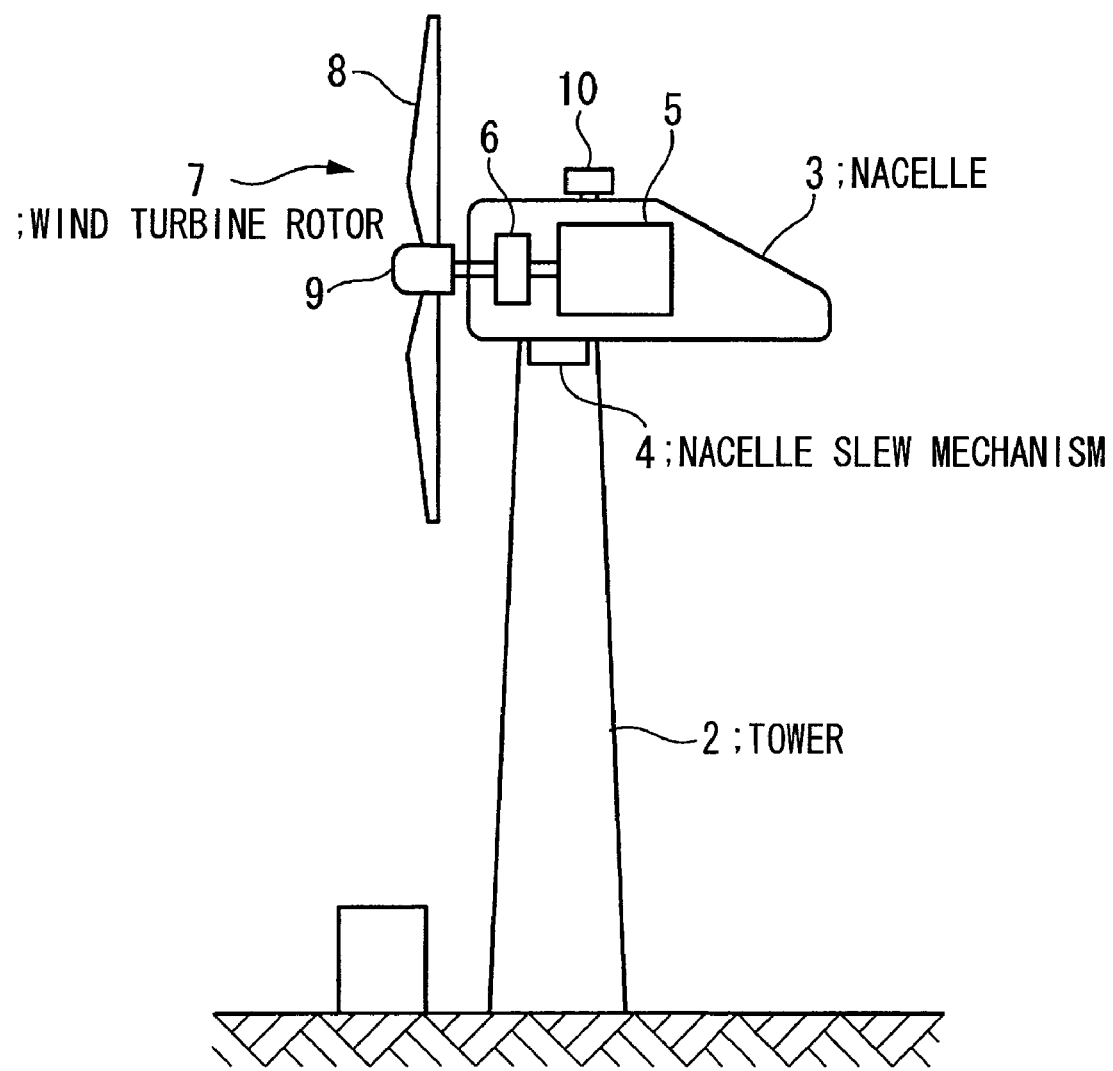
FIG. 2 is a diagram showing the configuration of a wind turbine according to an embodiment of the present invention.

As shown in FIG. 2, each wind turbine WTG is provided with a tower 2 and a nacelle 3 mounted on the top end of the tower 2. The nacelle 3 is capable of slewing in the yaw direction and is directed towards a desired direction by a nacelle slew mechanism 4. A generator 5 and a gearbox 6 are mounted in the nacelle 3. A rotor of the generator 5 is connected to a wind turbine rotor 7 through the gearbox 6.

Figure 3:
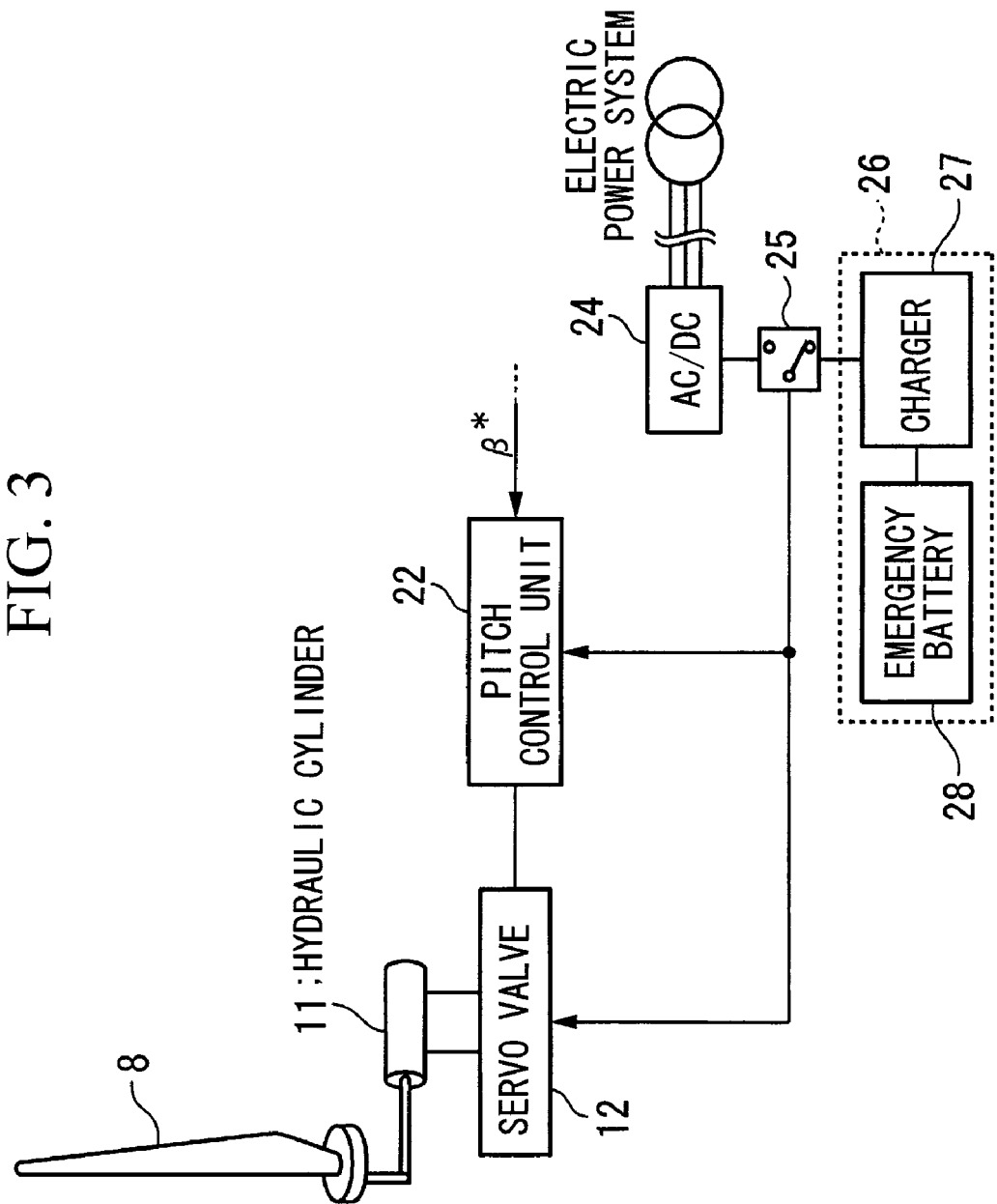
FIG. 3 is a diagram showing, in more detail, the configuration of the wind turbine shown in FIG. 2.

The wind turbine rotor 7 is provided with blades 8 and a hub 9 for supporting the blades 8. The blades 8 are mounted so that their pitch angles are adjustable. Specifically, as shown in FIG. 3, a hydraulic cylinder 11 for driving the blades 8 and a servo valve 12 for supplying hydraulic pressure to the hydraulic cylinder 11 are accommodated in the hub 9. Depending on the degree of opening of the servo valve 12, the hydraulic pressure to be supplied to the hydraulic cylinder 11 is controlled, and thereby, the blades 8 are controlled to the desired pitch angle.

Referring again to FIG. 2, a wind speed/direction meter 10 is further mounted in the nacelle 3. The wind speed/direction meter 10 measures wind speed and wind direction. The nacelle 3 is slewed in response to the wind speed and the wind direction measured by the wind speed/direction meter 10.

Figure 4:
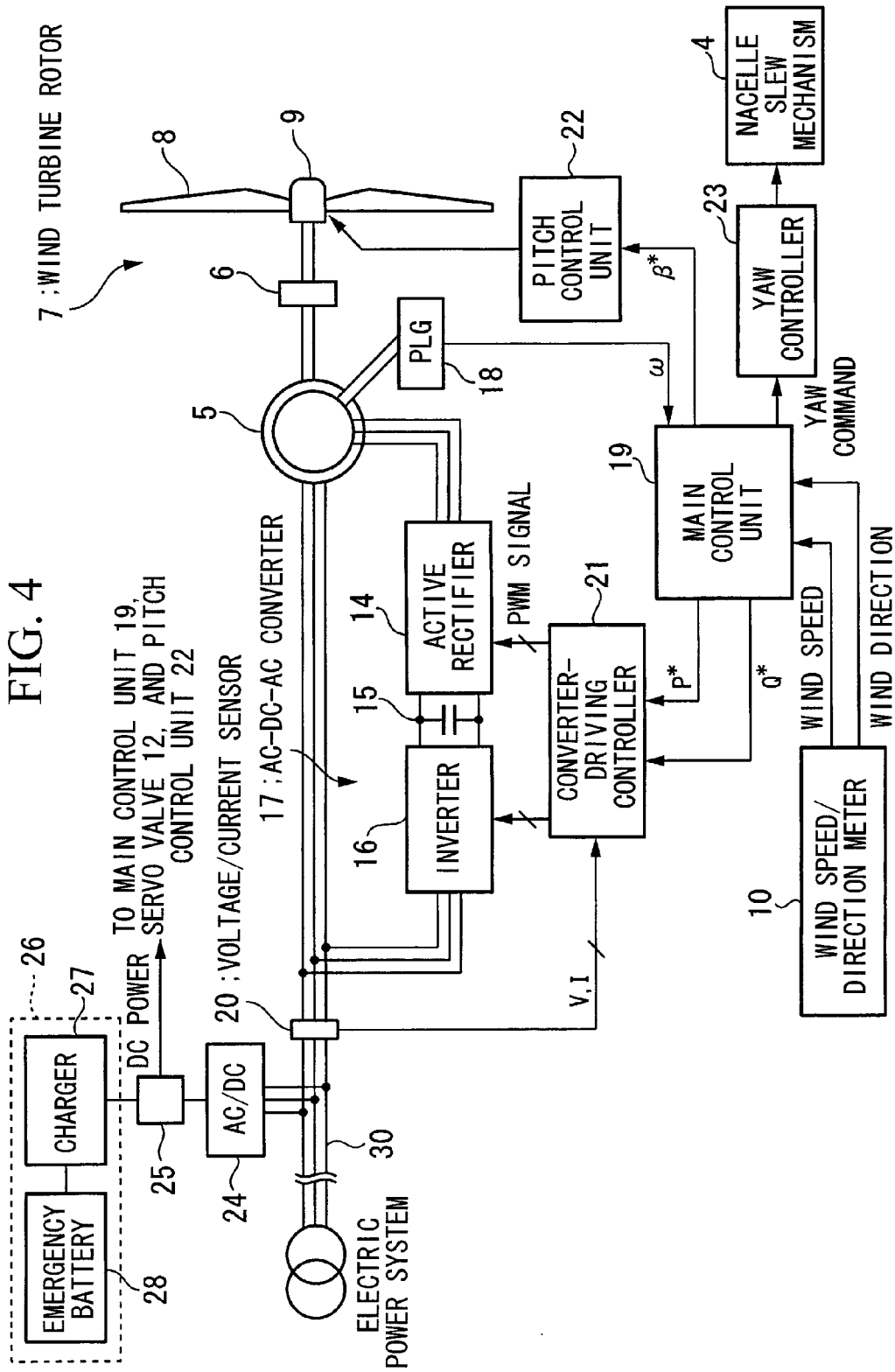
FIG. 4 is a block diagram showing an example configuration of a generator and the periphery thereof.

FIG. 4 is a block diagram showing an example configuration of the generator 5 and the periphery thereof. The generator 5 in this embodiment is configured so that the electrical power generated by the generator 5 can be output to the electric power system through both a stator coil and a rotor coil. Specifically, in the generator 5, its stator coil is connected to the electric power system directly, and the rotor coil is connected to the electric power system through an AC-DC-AC converter 17.

The AC-DC-AC converter 17 is formed of an active rectifier 14, a DC bus 15, and an inverter 16 and converts AC power received from the rotor coil into AC power that is adjusted to the frequency of the electric power system. The active rectifier 14 converts the AC power generated in the rotor coil into DC power, and outputs that DC power to the DC bus 15. The inverter 16 converts the DC power received from the DC bus 15 into AC power of the same frequency as the electric power system, and outputs that AC power.

The AC-DC-AC converter 17 also has a function to convert the AC power received from the electric power system into AC power that is adjusted to the frequency of the rotor coil, and the AC-DC-AC converter 17 is also used to excite the rotor coil depending on the operational states of the wind turbine WTG. In this case, the inverter 16 converts the AC power into the DC power and outputs that DC power to the DC bus 15. The active rectifier 14 converts the DC power received from the DC bus 15 into the AC power that is adjusted to the frequency of the rotor coil and supplies that AC power to the rotor coil of the generator 5.

A control system of the wind turbine WTG is formed of a PLG (pulse logic generator) 18, a main control unit 19, a voltage/current sensor 20, a converter-driving controller 21, a pitch control unit 22, and a yaw controller 23.

PLG 18 determines the rotational speed ω of the generator 5 (hereinafter referred to as "the generator rotational speed ω").

The main control unit 19 generates an active power command P*, a reactive power command Q*, and a pitch command β* in response to the generator rotational speed ω determined by the PLG 18, and further generates a yaw command in response to the wind speed and wind direction determined by the wind speed/direction meter 10. In addition, when a synchronization-canceling command is received from the central control device 100 (see FIG. 1), the main control unit 19 performs correction of the pitch angle command β* by 0.5° towards the feather side for a predetermined time. The details of this correction control will be described below.

The voltage/current sensor 20 is provided on the electric power line 30 that connects the generator 5 to the electric power system, and determines output voltage V and output current I of the generator 5.

The converter-driving controller 21 performs on/off control of the power transistor of the active rectifier 14 and the inverter 16 so as to control the output active power P and reactive power Q in response to the active power command P* and the reactive power command Q*. Specifically, the converter-driving controller 21 calculates the active power P and the reactive power Q from the output voltage V and the output current I determined by the voltage/current sensor 20. The converter-driving controller 21 also generates a PWM signal by conducting PWM control in response to the difference between the active power P and the active power command P* and the difference between the reactive power Q and the reactive power command Q*, and supplies the generated PWM signal to the active rectifier 14 and the inverter 16. Thus, the active power P and the reactive power Q are controlled.

The pitch control unit 22 controls the pitch angle β of the blades 8 in response to the pitch command β* sent from the main control unit 19. The pitch angle β of the blades 8 is controlled so as to be consistent with the pitch command β*.

The yaw controller 23 controls the nacelle slew mechanism 4 in response to the yaw command sent from the main control unit 19 and points the nacelle 3 in the indicated direction.

An AC/DC converter 24 is connected to the electric power line 30 that is wired within the wind turbine WTG. This AC/DC converter 24 generates DC power from the AC power received from the electric power system through the electric power line 30, and supplies that DC power to the control system of the wind turbine WTG, especially, the servo valve 12, the main control unit 19, and the pitch control unit 22 that are used to control the pitch angle β of the blades 8.

Further, in order to stably supply the DC power to the servo valve 12, the main control unit 19, and the pitch control unit 22, the wind turbine WTG is provided with an uninterruptible power system 26 provided with a charger 27 and an emergency battery 28. Due to the needs for the wind power generation system, like LVRT (Low Voltage Ride Through), it is necessary to maintain a state in which the generator 5 is connected to the electric power system even if the system voltage Vgrid is lowered. To do so, it is necessary to suitably control the pitch angle of the blades 8 even if the voltage of the electric power system is lowered, thereby maintaining the desired value of the rotational speed of the generator 5. In order to satisfy such needs, when the system voltage Vgrid is lowered to a predetermined voltage, the uninterruptible power system 26 is connected to the servo valve 12, the main control unit 19, and the pitch control unit 22 by a switch 25, and electric power is supplied from the emergency battery 28 to the servo valve 12, the main control unit 19, and the pitch control unit 22. Thereby, the control of the pitch angle of the blades 8 is maintained. The emergency battery 28 is connected to the charger 27. The charger 27 charges the emergency battery 28 with the DC power supplied from the AC/DC converter 24.

Next, the operation control method of the above-mentioned wind power generation system 1 will be described.

The central control device 100 shown in FIG. 1 collects time-series data Pi(t) of the output power (specifically, the active power) of each of the wind turbines WTG1, WTG2, . . . WTGn that constitute the wind power generation system 1.

Here, Pi(t)=P(kΔt), wherein "k" is the number of samplings and k=0, 1, 2 . . . , N, "Δt" is a sampling period, and "i" denotes the active power of the i-th wind turbine WTG.

With regard to the collection of the above-mentioned time-series data P(i), it is realized, for example, by obtaining time-series data of the active power and the reactive power that are calculated by the converter-driving controller 21 provided in each wind turbine WTG.

The central processing 100 collects the time-series data of the output of each wind turbine WTG and then calculates the correlation between the output fluctuations of the adjacent wind turbines in the wind power generation system 1 (in the wind farm). For this purpose, information related to the position of each wind turbine is registered in advance in the central processing device 100.

The above-mentioned calculation of the correlation may be conducted by using equation (2) shown below or by using a fast Fourier calculation (FFT) or the like. In addition, it is also possible to use other known methods.

[Equation 2]

$$R_{i,i+1}(m) = \frac{1}{N}\sum_{n=0}^{N-1} P_i(n)P_{i+1}(n+m) \quad (2)$$

provided that $-(N-1) \leqq m \leqq (N-1)$

Figure 5:
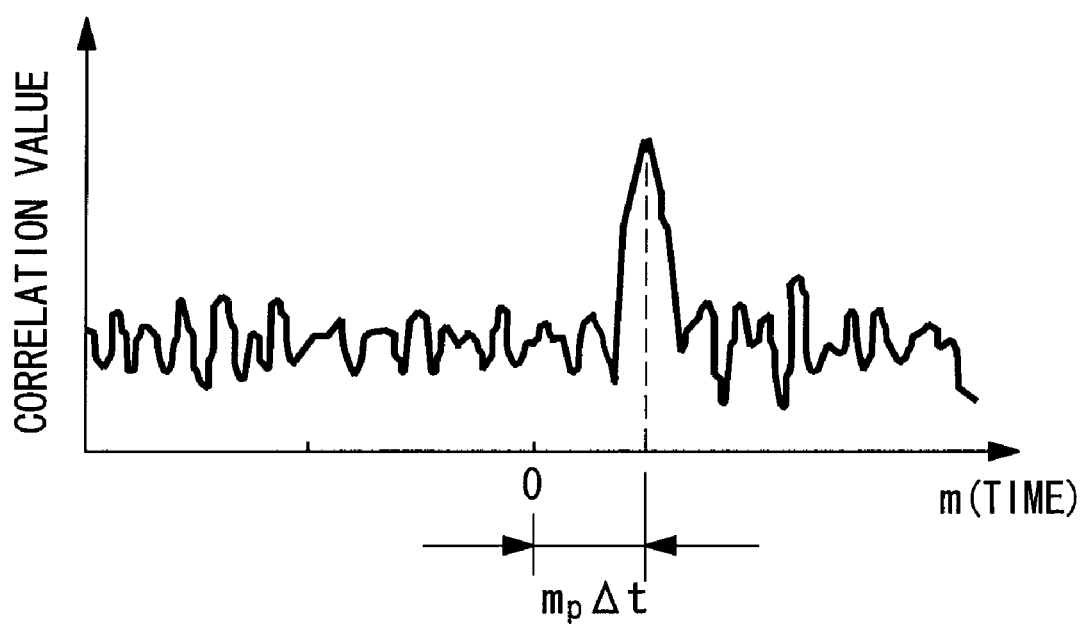
FIG. 5 is a graph showing an example of the correlation value of the output fluctuation of a wind turbine.

The central control device 100 conducts the calculations of the correlation relationship for each of i=1 to M−1 and determines whether or not adjacent wind turbines that are highly correlated exist. If there is a correlation, for example, a correlation peak like the one shown in FIG. 5 will appear. In FIG. 5, the horizontal axis represents time and the vertical axis represents the correlation value, and the time $m_p\Delta t$ represents the elapsed time from the time 0 that is the reference of the sampling time period. It is shown that a strong correlation of the output fluctuation is exhibited between the i-th wind turbine and the i+1-th wind turbine at this time.

If there is a pair of wind turbines that has exhibited a strong correlation of the output fluctuation, the central control device 100 sends a synchronization-canceling command for adjusting the pitch angle by a predetermined amount and information about the period (time) at which the correlation is exhibited to either wind turbine of the pair of wind turbines.

Here, with the constant-speed wind turbine, the above-mentioned correlation will be exhibited periodically since the rotational speed of the generator 5 is constant. Therefore, it is possible to estimate when the correlation will be exhibited in the future. In addition, even with a variable-speed wind turbine in which the rotational speed of the generator 5 is variable, it will be possible to estimate the time at which the correlation will be exhibited in the future by making the sampling time period of the time-series data of the output of the wind turbine shorter relative to the time period during which the rotational speed varies, for example, between one minute and several tens of minutes.

In the wind turbine WTG that has received the synchronization-canceling command from the central control device 100, the main control unit 19 shown in FIG. 4 corrects the above-mentioned pitch angle command β* to the extent that the correlation of the output fluctuation will not be exhibited between the adjacent wind turbines around the time $m_p\Delta t$ which the correlation is exhibited, and gives the corrected pitch angle command β*' to the pitch control unit 22. Specifically, the main control unit 19 gives the corrected pitch angle command β*' that is the above-mentioned pitch angle command β* being corrected by the predetermined amount (for example, 0.5°) towards the feather side to the pitch control unit 22 over the time period from $\frac{1}{2}m_p\Delta t$ to $\frac{1}{3}m_p\Delta t$ by taking the time $m_p\Delta t$ which the correlation is exhibited as a reference.

Because the rotational speed of the generator 5 at the time $m_p\Delta t$ is changed thereby, the phase of the output fluctuation becomes shifted. As a result, it is possible to lower the correlation of the output fluctuation between the adjacent wind turbines. Accordingly, the phase of the output fluctuation in the interconnection node A can be shifted, and it is possible to lower the output fluctuation in the interconnection node A for the wind farm as a whole.

The central control device 100 performs the above-mentioned processing repetitively at predetermined time intervals, thereby reducing the correlation between the output fluctuations of the adjacent wind turbines.

As described above, according to the wind power generation system and the operation control method thereof according to this embodiment, the correlation of the output fluctuations of the wind turbines positioned adjacently is obtained and, if that correlation is strong, the phase of the output fluctuation of either one of the adjacent wind turbines is shifted by the period at which that strong correlation is exhibited, therefore, it is possible to weaken the correlation of the output fluctuations between the adjacent wind turbines.

As a result, it is possible to relax the output fluctuation in the interconnection node to which the output power of each wind turbine is supplied, and to supply more stable electric power to the electric power system.

Although the embodiment of the present invention has been described above with reference to the drawings, the actual configuration is not limited to this embodiment; design modifications that do not depart from the spirit of the present invention are also encompassed.

For example, although the correlation of the output fluctuation is lowered by correcting the pitch angle command in the above-mentioned embodiment, the correlation of the output fluctuation may be lowered by changing other parameters. For example, an azimuth angle may be adjusted, and in the case of the variable-speed wind turbine, the rotational speed of a motor may be adjusted.

In addition, although the output of the each wind turbine is monitored and the presence of the correlation is determined from these monitoring results in the above-mentioned embodiment, instead of this, the azimuth angle of the each wind turbine may be monitored and the correlation may be determined to be high if this azimuth angle is in synchronization. In this case, any of pitch, rotational speed, and azimuth angle may be controlled so as to avoid the synchronization of the azimuth angle.

The invention claimed is:

1. An operation control method of a wind power generation system provided with a plurality of wind turbines, in which output power of each wind turbine is supplied to an electric power system through a common interconnection node, the operation control method of the wind power generation system comprising:
　a step of obtaining output data of each wind turbine,
　a step of determining a periodic correlation between output fluctuations of adjacent wind turbines by using the output data,
　a step of determining that the correlation is a strong correlation which is more than two times greater than an average level of the correlation, and
　a step of shifting a phase of the output fluctuation of either one of the adjacent wind turbines by a period of the strong correlation.

2. An operation control method of a wind power generation system according to claim 1, wherein the phase of the output fluctuation is shifted by changing a blade pitch angle of either one of the adjacent wind turbines.

3. An operation control method of a wind power generation system according to claim 1, wherein the phase of the output fluctuation is shifted by changing a rotational speed of a generator of either one of the adjacent wind turbines.

4. A wind power generation system provided with a plurality of wind turbines, in which output power of each wind turbine is supplied to an electric power system through a common interconnection node, wherein:
　output data of each wind turbine is obtained,
　a periodic correlation between output fluctuations of adjacent wind turbines is determined by using the output data,
　the correlation is determined as a strong correlation when the correlation is more than two times greater than an average level of the correlation, and
　a phase of the output of either one of the adjacent wind turbines is shifted by a period of the strong correlation.

5. An operation control method of a wind power generation system according to claim 3, wherein the rotational speed of the generator is measured by a pulse logic generator (PLG).

6. An operation control method of a wind power generation system according to claim 5, wherein the rotation speed measured by the PLG is sent to a main control unit which generates an active power command, a reactive power command, and a pitch angle command in response to the rotational speed sent thereto.

7. An operation control method of a wind power generation system according to claim 6, wherein the main control unit further generates a yaw command in response to a wind speed and a wind direction determined by a wind speed/direction meter.

8. An operation control method of a wind power generation system according to claim 7, wherein the main control unit corrects the pitch angle command by 0.5° towards a feather side for a predetermined time.

\* \* \* \* \*